US012750339B2

(12) United States Patent
Maarseveen et al.

(10) Patent No.: US 12,750,339 B2
(45) Date of Patent: Sep. 29, 2026

(54) INTRA-LAN NETWORK DEVICE ISOLATION

(71) Applicant: Avast Software s.r.o., Prague (CZ)

(72) Inventors: Wicher Thomas Maarseveen, Prague (CZ); Jiří Suška, Brno (CZ)

(73) Assignee: Avast Software s.r.o., Prague (CZ)

( * ) Notice: Subject to any disclaimer, the term of this patent is extended or adjusted under 35 U.S.C. 154(b) by 211 days.

(21) Appl. No.: 17/153,657

(22) Filed: Jan. 20, 2021

(65) Prior Publication Data

US 2022/0231990 A1 Jul. 21, 2022

(51) Int. Cl.
*H04L 9/40* (2022.01)
*H04L 61/10* (2022.01)
*H04L 101/659* (2022.01)

(52) U.S. Cl.
CPC .......... *H04L 63/0236* (2013.01); *H04L 61/10* (2013.01); *H04L 63/1416* (2013.01); *H04L 63/145* (2013.01); *H04L 2101/659* (2022.05)

(58) Field of Classification Search
CPC ......... H04L 2101/622; H04L 2101/659; H04L 61/10; H04L 61/103; H04L 61/5014; H04L 63/0236; H04L 63/1416; H04L 63/145
See application file for complete search history.

(56) References Cited

U.S. PATENT DOCUMENTS 7,945,656 B1 * 5/2011 Remaker ............... H04L 47/283 709/224
8,898,788 B1 * 11/2014 Aziz .................. H04L 63/1491 726/23
10,257,295 B1 * 4/2019 Alpert .................. H04L 67/535
10,574,654 B1 * 2/2020 Schroeder ........... H04L 63/0209
2005/0278784 A1 * 12/2005 Gupta .................. H04L 63/145 726/23
2006/0184454 A1 * 8/2006 Ananda ................. G06F 21/10 705/57
2010/0241744 A1 * 9/2010 Fujiwara ................ H04L 43/00 709/224
2010/0242084 A1 * 9/2010 Keeni ..................... H04L 63/20 726/1
2012/0030731 A1 * 2/2012 Bhargava ............... H04L 63/10 726/3
2012/0213094 A1 * 8/2012 Zhang ................. H04L 63/0281 370/252

(Continued)

OTHER PUBLICATIONS

Horowitz, Michael. Using VLANs for Network Isolation. RouterSecurity.org. Dec. 15, 2017. Accessed at: https://routersecurity.org/vlan.php.

(Continued)

*Primary Examiner* — Daniel B Potratz
*Assistant Examiner* — Matthias Habtegeorgis
(74) *Attorney, Agent, or Firm* — AVEK IP, LLC; Mark C. Young

(57) ABSTRACT

A private network device such as a security device is inserted in a local network and is operable to isolate networked devices on the local network. The networked security device uses Internet Protocol spoofing to intercept network traffic between at least two networked devices on the same local network as the networked security device, and selectively blocks intercepted network traffic between the at least two networked devices on the local network.

16 Claims, 4 Drawing Sheets

(56) References Cited

U.S. PATENT DOCUMENTS

| | | | | |
|---|---|---|---|---|
| 2015/0020188 | A1* | 1/2015 | Segal | H04L 63/0245 726/13 |
| 2016/0315909 | A1* | 10/2016 | von Gravrock | G06F 21/566 |
| 2017/0093910 | A1* | 3/2017 | Gukal | H04L 63/1416 |
| 2017/0093916 | A1* | 3/2017 | Arumugam | G06F 21/602 |
| 2017/0149775 | A1* | 5/2017 | Bachar | H04L 67/535 |
| 2019/0013958 | A1* | 1/2019 | von Gravrock | H04L 12/283 |
| 2019/0044948 | A1* | 2/2019 | Beals | H04L 63/105 |
| 2020/0076799 | A1* | 3/2020 | Lackey | G06F 21/73 |
| 2020/0112544 | A1* | 4/2020 | Smith | H04L 45/72 |
| 2021/0051180 | A1* | 2/2021 | Barnett | H04L 69/16 |
| 2021/0211408 | A1* | 7/2021 | Porras | G06F 11/3452 |
| 2022/0060498 | A1* | 2/2022 | Head, Jr. | H04L 12/4633 |

OTHER PUBLICATIONS

Huang, Ai-Rong, et al. Design and Implementation of Hosts Quarantine System with Cooperation Support in LAN. Computer Engineering and Design, 2009. 30(No. 18). pp. 4163-4166, 4171.

* cited by examiner

INTRA-LAN NETWORK DEVICE ISOLATION

FIELD

The invention relates generally to managing security in a network, and more specifically to isolation of network devices within a Local Area Network (LAN).

BACKGROUND

Computers are valuable tools in large part for their ability to communicate with other computer systems and retrieve information over computer networks. Networks typically comprise an interconnected group of computers, linked by wire, fiber optic, radio, or other data transmission means, to provide the computers with the ability to transfer information from computer to computer. The Internet is perhaps the best-known computer network, and enables millions of people to access millions of other computers such as by viewing web pages, sending e-mail, or by performing other computer-to-computer communication.

But, because the size of the Internet is so large and Internet users are so diverse in their interests, it is not uncommon for malicious users to attempt to communicate with other users' computers in a manner that poses a danger to the other users. For example, a hacker may attempt to log in to a corporate computer to steal, delete, or change information. Computer viruses or Trojan horse programs may be distributed to other computers or unknowingly downloaded such as through email, download links, or smartphone apps. Further, computer users within an organization such as a corporation may on occasion attempt to perform unauthorized network communications, such as running file sharing programs or transmitting corporate secrets from within the corporation's network to the Internet.

For these and other reasons, many computer systems employ a variety of safeguards designed to protect computer systems against certain threats. Firewalls are designed to restrict the types of communication that can occur over a network, antivirus programs are designed to prevent malicious code from being loaded or executed on a computer system, and malware detection programs are designed to detect remailers, keystroke loggers, and other software that is designed to perform undesired operations such as stealing information from a computer or using the computer for unintended purposes. Similarly, website scanning tools are used to verify the security and integrity of a website, and to identify and fix potential vulnerabilities.

For example, a firewall in a home or office may restrict the types of connection and the data that can be transferred between the internal network and an external or public network such as the Internet, based on firewall rules and characteristics of known malicious data. The firewall is typically a computerized network device that inspects network traffic that passes through it, permitting passage of desirable network traffic while blocking undesired network traffic based on a set of rules. A firewall or similar network security device may be integrated into a home or small business router, or may be a standalone device such as a device connected to a router and configured to filter traffic between a public network and devices on a private network.

In a more detailed example of a standalone security device not integrated within a router, the network security device is coupled to the router via a network connection and is configured to receive or intercept data sent between external computer systems and devices on the internal private network. This is achieved in one example by using Address Resolution Protocol (ARP) spoofing, by which the security device associates its own MAC address with the IP address of a different device that is a target of communication. The security device can then intercept the external network data and screen it before forwarding it to the intended destination, such as an internal private network device. In other examples, other methods are similarly used to configure the security device between the external network and internal or private network devices.

But, such solutions can be difficult to implement, and do not protect devices within the Local Area Network (LAN) from other devices, such as an infected system. In a typical home network environment, a single infected device may potentially infect or steal data from dozens of other local network devices, posing a serious security threat. It is therefore desirable to protect devices within a local network from such malicious activity.

SUMMARY

In one example embodiment, a private network device such as a security device is inserted in a local network and is operable to isolate networked devices on the local network. In a more detailed example, this is performed by using Internet Protocol spoofing in the networked security device to intercept network traffic between at least two networked devices on the same local network as the networked security device, and selectively blocking intercepted network traffic between the at least two networked devices on the local network.

The details of one or more examples of the invention are set forth in the accompanying drawings and the description below. Other features and advantages will be apparent from the description and drawings, and from the claims.

DETAILED DESCRIPTION

Figure 1:
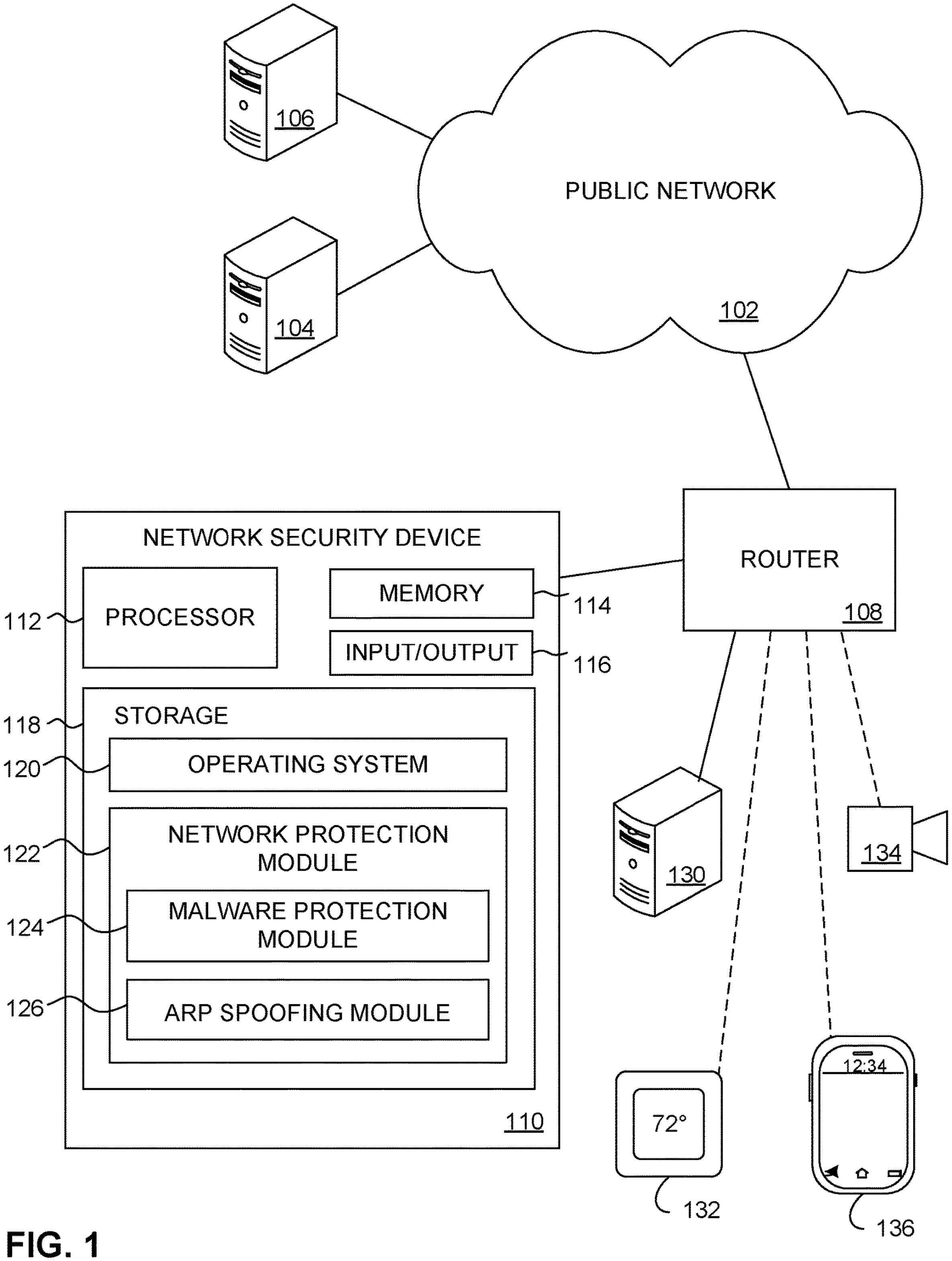
FIG. 1 shows a private network with a network security device configured to selectively block traffic between local network devices, consistent with an example embodiment.

In the following detailed description of example embodiments, reference is made to specific example embodiments by way of drawings and illustrations. These examples are described in sufficient detail to enable those skilled in the art to practice what is described, and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to define these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As networked computers and computerized devices such as smart phones become more ingrained into our daily lives, the value of the information they store, the data such as passwords and financial accounts they capture, and even their computing power becomes a tempting target for criminals. Hackers regularly attempt to log in to computers to steal, delete, or change information, or to encrypt the information and hold it for ransom via "ransomware." Smartphone apps, Microsoft® Word documents containing macros, Java' applets, and other such common documents are all frequently infected with malware of various types, and so users rely on tools such as antivirus software or other malware protection tools to protect their computerized devices from harm.

An increasing number of computerized devices such as home appliances, vehicles, and other devices (known collectively as the Internet of Things, or IoT) are connected to public networks and are also susceptible to unauthorized interception or modification of data. For example, many popular security cameras are known to have vulnerabilities through which attackers can access the device without authorization, enabling the attackers to view and record image data from the cameras or to control camera operation. Similar vulnerabilities are known to exist or may exist in other IoT devices, including network-connected home security systems such as electronic locks, home appliances such as smart thermostats or kitchen appliances, and vehicles with network access.

In a typical home computer or corporate environment, firewalls inspect and restrict the types of communication that can occur between local devices such as computers or IoT devices and the Internet, antivirus programs prevent known malicious code from being loaded or executed on a computer system, and malware detection programs detect known malicious code such as remailers, keystroke loggers, and other software that is designed to perform undesired operations such as stealing information from a computer or using the computer for unintended purposes.

A firewall or similar network security device in a home or office may be integrated into a router, or may be a standalone device such as a device connected to a router and configured to filter traffic exchanged between a public network and devices on a private network before forwarding such traffic between the public and private networks. In a more detailed example of a standalone security device, the device is coupled to a router via a network connection and is configured to receive or intercept data sent between external computer systems and devices on the internal private network, such as by Address Resolution Protocol (ARP) spoofing, Dynamic Host Configuration Protocol (DHCP) settings, Neighborhood Discovery Protocol spoofing for IPv6, or another suitable method.

In ARP spoofing, the security device associates its own MAC addresses with the IP addresses of the network's router and at least one device on the private network to be protected by the security device, such that a substitute MAC address of the network security device is associated with the protected device's IP address rather than the protected device's own MAC address. The security device achieves this in a more detailed example by sending ARP packets across the internal network that contain the security device's MAC address and the protected device's IP address, such that other devices on the network such as the router and switches will cache the MAC address of the security device as being associated with the protected device's IP address. Network data on the internal network destined for the protected device will therefore instead be routed to the security device, which can screen it before forwarding it to the protected device on the private network. This process is repeated for other devices on the private network to be protected.

In a further example, a similar process is also performed for the router such that the outbound traffic from local network devices destined for the router is also filtered by the security device. In one such example, network traffic from private network devices destined for the router's MAC address are routed to the security device via a spoofed MAC address associated with the router's IP address, distributed by ARP packets as described above.

But, such systems do not protect devices on a local area network from undesired communication with other devices on the same local network, such as an infected security camera stealing data from other computers on the local network (which can then be sent to a remote server) or from an infected local network device infecting additional local network devices.

Some examples presented herein therefore provide for selective isolation of local network devices from other devices on the local network by Internet Protocol spoofing, such as Address Resolution Protocol (ARP) spoofing, using a security device on the local network. In a more detailed example, a network security device uses ARP spoofing to insert itself between a first local network device such as a device determined to be infected, insecure, or untrusted, and other local network devices, and to selectively block traffic between the first local network device and other local network devices. In a further example, the network security device allows traffic between the first local network device and an external network such as the Internet, thereby allowing potentially insecure devices such as security cameras, Internet of Things (IoT) devices, and unrecognized devices to perform their intended functions while restricting their access to other devices on the local network.

The networked security device is further operable in some examples to detect an infected device, to determine whether a device is trusted or untrusted, and/or to make a determination as to the security of local network devices, and to selectively block communication with other local network devices based on such determinations. Selective blocking in a more detailed example comprises using iptables or ip6tables rules to process or filter network traffic, such as within a firewall component of the network security device.

FIG. 1 shows a private network with a network security device configured to selectively block traffic between local network devices, consistent with an example embodiment. A public network 102 links remote computer systems such as servers 104 and 106 to a local private network via router 108. The local network in this example includes network security device 110, which includes a processor 112, memory 114, input/output 116 (such as a network interface), and storage 118. The storage stores instructions executable on processor 112 to perform certain functions, including operating system 120 and network protection module 122.

The network protection module includes a malware protection module 124 which is operable to inspect traffic between one or more private network devices and the public network 102 for malicious content, and in a further example operable to inspect network traffic between different devices 130-136 on the local network. ARP spoofing module 126 is operable to spoof the IP addresses of the router or gateway and the client devices to insert itself between the devices on the network, and in an alternate example uses another IP spoofing technology such as Internet Protocol v6's Neighbor Discovery Protocol or the like.

The local network's client devices in this example include computer 130, smart thermostat 132, camera 134, and smartphone 136. The network security device in this example is configured to protect the private network devices from threats such as an outside attacker or other such threats coming from the public network 102 to the private network via the router or gateway 108, as well as to protect the client devices on the local network from one another should a local network device be determined to be infected, insecure, or untrusted.

In operation, the various devices on the private network, such as computer 130, smart thermostat 132, camera 134, and smartphone 136, are configured to exchange data with one or more computerized devices on the public network, such as servers 104 and 106. For example, computer 130 and smartphone 136 may load web pages and emails from public network servers, while smart thermostat 132 and camera 134 send data regarding their operation to servers configured to facilitate control and storage of HVAC and captured video data. But, because the client devices are all on the same local network behind router 108's firewall or similar protection, the client devices can generally communicate freely with each other. Although this is desirable in most instances, such as where a user employs computer 130 to monitor camera 134 or uses smartphone 136 to adjust smart thermostat 132, it can be problematic such as where a device such as computer 130 becomes infected or where a device such as camera 130 is determined to be insecure or untrusted due to known or suspected security flaws.

Because each of these local network devices is operable to exchange data with other computerized devices, including those on the local network, other devices on the local network are vulnerable to being attacked with various types of malicious software or malware. For example, an attacker accessing the local network through a security flaw in camera 134 may use the camera's ability to access other devices on the local network to target computer 130 with viruses that infect the computer and perform functions such as mine cryptocurrency, send spam emails, encrypt files that are held ransom for payment (ransomware), or other such malicious activity. Smart thermostat 132 may similarly have its heating and cooling settings tampered with, or may have other features such as an interactive voice service such as Alexa® tampered with to enable eavesdropping or other malicious activity. In some examples, malware protection module 124 of the network security device 110 is employed to determine whether local network devices are infected, insecure, or untrusted.

The local network devices 130-136 communicate with other devices on the local network via router 108, which directs traffic from the local network devices 130-136 to the intended local target device. In the example of FIG. 1, the network security device 110 will employ its ARP spoofing module 126 to selectively "spoof" or take the place of one or more local devices that are suspected of being infected, insecure, or untrusted, thereby effectively intercepting traffic to and from the suspect local device. In a further example, the suspect local device can still communicate with other devices such as 104 and 106 on a public network 102 such as the Internet, which may in some examples also involve network security device 110 using ARP spoofing to insert itself between the router 108 and the suspect device to intercept and monitor and/or selectively filter such traffic.

In a more detailed example of ARP spoofing, the network security device 110 selectively provides isolation to local network devices 130-136 by taking advantage of network protocols for establishing network address records to insert itself between communicating network devices. A new device attached to a private network is typically assigned an IP address using the Dynamic Host Configuration Protocol, or DHCP, via a DHCP server (such as router 108) that is responsible for ensuring each device on the private network has a unique IP address. The new device broadcasts a DHCP discovery request on the private network, and one or more DHCP servers receive the request and reserve an IP address which is then offered to the new device. The new device replies with a DHCP request accepting the reserved IP address from a DHCP server (accepting only a single offer if multiple IP address offers are received), which the DHCP server then acknowledges. The router then sends an Address Resolution Protocol (ARP) request across the network, ensuring the new device is the only device on the private network using the assigned IP address.

When the new device wishes to communicate with another device on the network, it broadcasts an ARP request packet with the intended destination's IP address. The intended destination computer responds with its MAC address, which the new device and any other listening devices then store in an ARP table (or a neighbor table) associated with the intended destination's IP address for future use. The new device can now use the intended destination's MAC address to communicate with the intended destination device.

The network security device 110 of FIG. 1 in some examples uses ARP spoofing to "spoof" or take the place of a suspicious one or more of the local network devices 130-136, thereby effectively inserting itself between the one or more suspicious local network devices and other devices on the local network. This effectively isolates the suspicious local network device or devices from other devices on the network, in that the network security device can intercept traffic to and from the suspect network device and choose whether to forward the traffic to the intended destination device. In a further example, the network security device forwards data received from or directed to a suspect device to the intended destination after screening the data, enabling the network security device 110 to monitor and selectively restrict communication between local devices 130-136.

ARP spoofing is achieved in a more detailed example by sending an ARP unicast, announcement broadcast, or other ARP packets to other devices on the private network that falsely updates IP to MAC address mapping in the neighbor tables of local network devices so that data intended for select devices such as the suspect device instead is routed to the network security device's MAC address, enabling network security device to insert itself as "man-in-the-middle" between select local network devices 130-136.

In the example of FIG. 1, some client devices such as 130-136 may not successfully respond to the network security device 110's ARP spoofing attempt, and so may remain directly connected to one another. This can happen for a variety of reasons, such as multiple or conflicting MAC addresses being cached for the same IP in a client device, devices rebroadcasting ARP packets after the network security device has inserted itself in the network (thereby undoing the spoofing), or devices that may connect to the private network only intermittently such as video camera 134 being in an inactive state or smart phone 136 being away from home when an ARP spoofing attempt takes place. For this reason, ARP packets are sent periodically from the network security device 110 to ensure that it remains inserted between isolated devices and the rest of the local network 130-136.

If an ARP packet is sent from an isolated client device, the network security device is also at risk of being removed from its spoofed logical network position between the isolated or suspect network device and other local network devices, and so sends its own ARP packets to each other local device in its active device database. ARP spoofing the router/gateway to isolate a local network device in a more detailed example comprises sending multiple unicast ARP request/reply packets from the network security device to client devices on the local network. If an ARP packet is broadcast from an isolated client device looking for a target device on the local network, other network devices will receive the ARP broadcast and the target device will reply and become unspoofed.

The network security device therefore monitors spoofed or isolated client devices and/or the router for ARP packets, and sends a batch of ARP packets to the router for the target device that has sent its own ARP packets in response, or vice versa. In a more detailed example, the network security device delays sending the ARP packets for a period such as several milliseconds to several seconds to ensure that the client device's ARP packet exchange is complete before it re-spoofs the client device by sending its own ARP packets. In some such embodiments, multiple ARP packets are sent at different times from the network security device, reducing the chances of the unspoofed client device communicating a significant amount of network traffic directly with the router/gateway rather than through the network security device and vice versa. This process ensures that an isolated local network device remains isolated as intended, allowing the network security device 110 to selectively intercept, analyze, and/or drop traffic between the isolated local network device and other local network devices.

Although the examples presented here use ARP spoofing as it is commonly known in the Internet Protocol version 4 (IPv4) address space, the same or substantially similar spoofing may be performed in the Internet Protocol version 6 (IPv6) address space, such as spoofing using IPv6's Neighborhood Discovery Protocol, or NDP. For purposes of these examples and the appended claims, ARP spoofing includes spoofing using NDP or other corresponding or substantially similar network protocols.

Figure 2:
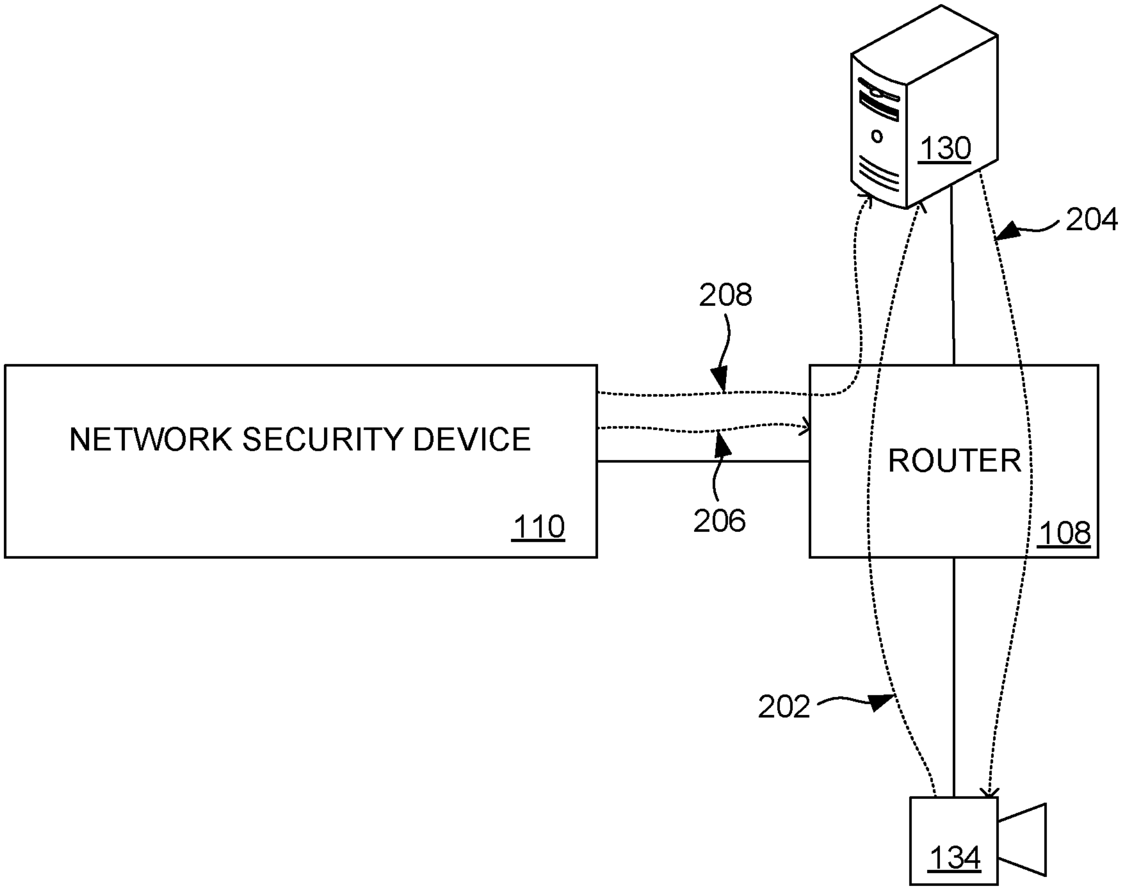
FIG. 2 is a network diagram showing maintaining ARP spoofing for isolated local network devices, consistent with an example embodiment.

FIG. 2 is a network diagram showing maintaining ARP spoofing for isolated local network devices, consistent with an example embodiment. In this example, a local network device such as camera 134 (also of FIG. 1) has been determined to be insecure, infected, or untrusted, such as by analysis via the network security device 110. The network security device has performed ARP spoofing on the camera 134 to instruct the camera to send traffic intended for other local network devices to the network security device, and in a further example has similarly performed ARP spoofing on other local network devices to tell them to send traffic intended for the network camera to the network security device instead. But, when the network camera 134 attempts to communicate with another local network device such as computer 130 by sending an ARP broadcast, the resulting ARP exchange can cause the ARP spoofing to become undone, undoing isolation of the camera 134.

When the isolated network camera 134 sends an ARP broadcast looking for computer 130 on the local network, the ARP broadcast reaches the local computer as shown at 202. The local computer 130 responds with its MAC address, which causes the camera 134 and other devices on the local network such as router 108 to now recognize the computer 130's actual MAC address rather than a MAC address handled by the network security device 110 as being associated with the computer 130. This process shown at 202-204 causes the computer 130 to become unspoofed in the view of router 108 and the isolated network camera 134.

Network security device 110 also receives the ARP broadcast packet from isolated camera 134, and knows that the local network computer 130 will respond to the camera with its MAC address thereby causing the connection to become unspoofed. The network security device therefore waits a small time such as several milliseconds for the computer 130 to send its reply, and sends another reply with its own MAC address pretending to be the computer. Because the network security device's reply arrives after the reply from the computer 130, the network security device's MAC address is the one that remains recorded in the router and laptop's routing tables as being the MAC address associated with the computer 130.

In a further example, the network security device sends multiple packets over a period of time to the isolated local network camera 134, such as by sending one five milliseconds after receiving the camera 134's ARP broadcast packet, one after ten milliseconds, one after 20 milliseconds, one after 100 milliseconds, and one after a second. In an alternate embodiment, several such packets are sent within a determined period of time, such as one second or five seconds after receiving the ARP broadcast packet from the camera 134, thereby addressing both the desire to ensure that a reply packet from the network security device 110 arrives after the reply packet from computer 130, and addressing the desire to respond promptly with a reply packet so that the isolated local network camera 134 remains unspoofed for relatively little time.

Figure 3:
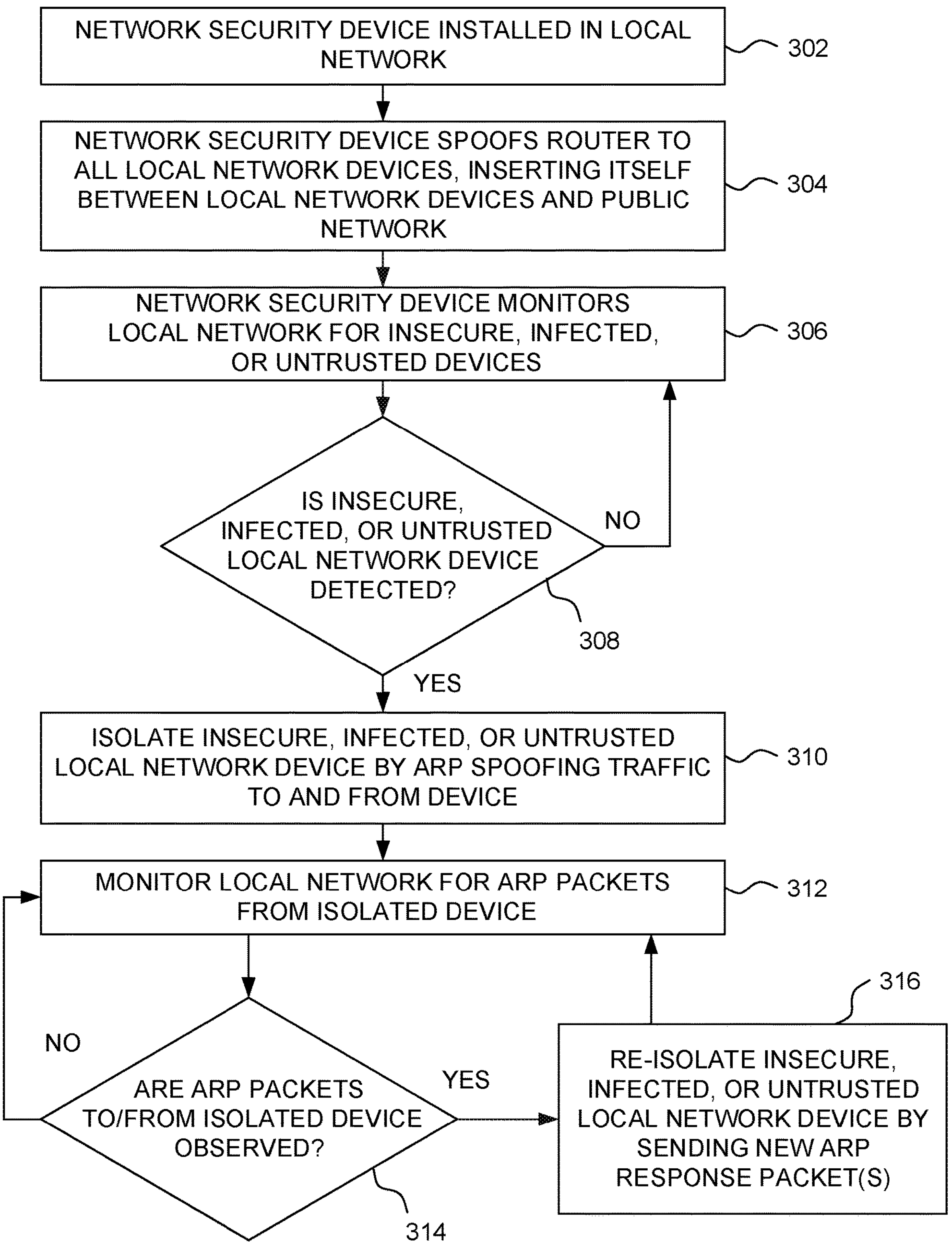
FIG. 3 is a flowchart of a method of isolating a suspicious local network device, consistent with an example embodiment of the invention.

FIG. 3 is a flowchart of a method of isolating a suspicious local network device, consistent with an example embodiment. At 302, a network security device such as 110 of FIG. 1 is installed in a local network. The network security device configures the local network to protect devices on the local network from external threats by using ARP spoofing to insert itself between the local network devices and the router, spoofing the router to all local network devices, and vice versa, as shown at 304. The network security device can then monitor traffic between the local network devices and the external network, selectively blocking the traffic if a threat is detected.

The network security device also monitors the local network for devices that are known to be insecure, such as web cameras with known insecure firmware, computers running operating systems with known vulnerabilities, or other such security issues. Similarly, the network security device monitors for devices that are infected, such as by looking for network traffic characteristic of infected devices such as contacting known botnet controllers, sending data characteristic of a mass emailer or cryptocurrency miner, or the like. Other suspicious or untrusted devices are also identified using similar methods at 308, where a determination is made as to whether any devices on the local network are insecure, infected, or untrusted.

If no such insecure, infected, or untrusted devices are found, monitoring resumes at 306. If such devices are found on the local network, the network security device isolates the insecure, infected, or untrusted device at 310 by inserting itself between the device and other devices on the local network using ARP spoofing, as illustrated in the examples of FIGS. 1 and 2. In a further example, the isolated local network device is still permitted to communicate with the external or public network, either with or without such traffic being monitored and filtered by the network security device, such as where an insecure web camera 134 is permitted to continue providing video to external systems such as a security or remote monitoring service but prevented from communicating with or infecting other local devices.

At 312, the network security device monitors the local network for ARP packets to or from the isolated device, such as an ARP broadcast packet from the isolated device looking for another local network device or another local network device looking for the isolated device. If such ARP packets to or from the isolated device are discovered at 314, the network security device re-isolates the insecure, infected, or untrusted device at 316 such as in the example of FIG. 2. The network security device then continues monitoring for additional ARP packets to or from the isolated device at 312, and monitoring the local network for additional insecure, infected, or untrusted devices at 306.

Using methods such as are shown in these examples, a network security device or similar device on a local network can isolate a suspect device from other devices on the local network, thereby protecting the rest of the network from the suspect device. Methods such as ARP spoofing can be effectively used to insert the network security device between the isolated device and other local network devices, enabling monitoring, filtering, or other processing of traffic to and from the isolated device. The isolated device in some examples is able to continue to communicate with external devices such as remote Internet servers or the like, but is prevented from copying data to, from or infecting other devices on the local network.

Figure 4:
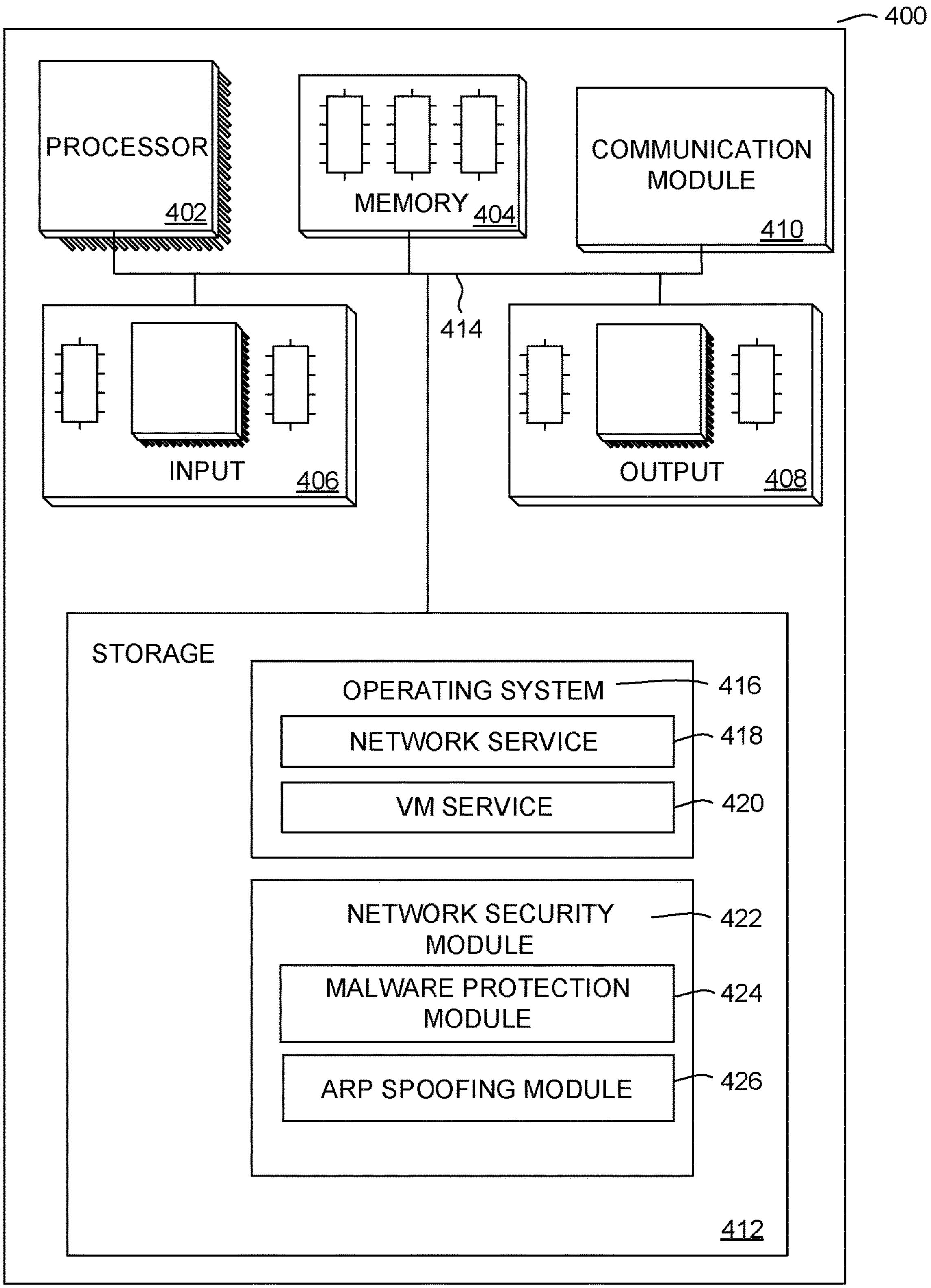
FIG. 4 is a network security device, consistent with an example embodiment of the invention.

Although the network security device, client device, and other computerized devices are shown as specific computerized devices in various examples presented herein, in other embodiments they will have fewer, more, and/or other components or features, such as those described in FIG. 4. FIG. 4 is a computerized network security device, consistent with an example embodiment of the invention. FIG. 4 illustrates only one particular example of network security device 400, and other computing devices may be used in other embodiments. Although network security device 400 is shown as a standalone computing device, device 400 may be any component or system that includes one or more processors or another suitable computing environment for executing software instructions in other examples, and need not include all of the elements shown here.

As shown in the specific example of FIG. 4, network security device 400 includes one or more processors 402, memory 404, one or more input devices 406, one or more output devices 408, one or more communication modules 410, and one or more storage devices 412. Device 400 in one example further includes an operating system 416 executable by network security device 400. The operating system includes in various examples services such as a network service 418 and a virtual machine service 420 such as a virtual server or various modules described herein. One or more applications, such as network security module 422 are also stored on storage device 412, and are executable by network security device 400.

Each of components 402, 404, 406, 408, 410, and 412 may be interconnected (physically, communicatively, and/or operatively) for inter-component communications, such as via one or more communications channels 414. In some examples, communication channels 414 include a system bus, network connection, inter-processor communication network, or any other channel for communicating data. Applications such as network security module 422 and operating system 416 may also communicate information with one another as well as with other components in device 400.

Processors 402, in one example, are configured to implement functionality and/or process instructions for execution within computing device 400. For example, processors 402 may be capable of processing instructions stored in storage device 412 or memory 404. Examples of processors 402 include any one or more of a microprocessor, a controller, a digital signal processor (DSP), an application specific integrated circuit (ASIC), a field-programmable gate array (FPGA), or similar discrete or integrated logic circuitry.

One or more storage devices 412 may be configured to store information within network security device 400 during operation. Storage device 412, in some examples, is known as a computer-readable storage medium. In some examples, storage device 412 comprises temporary memory, meaning that a primary purpose of storage device 412 is not long-term storage. Storage device 412 in some examples is a volatile memory, meaning that storage device 412 does not maintain stored contents when network security device 400 is turned off. In other examples, data is loaded from storage device 412 into memory 404 during operation. Examples of volatile memories include random access memories (RAM), dynamic random access memories (DRAM), static random access memories (SRAM), and other forms of volatile memories known in the art. In some examples, storage device 412 is used to store program instructions for execution by processors 402. Storage device 412 and memory 404, in various examples, are used by software or applications running on network security device 400 such as network security module 422 to temporarily store information during program execution.

Storage device 412, in some examples, includes one or more computer-readable storage media that may be configured to store larger amounts of information than volatile memory. Storage device 412 may further be configured for long-term storage of information. In some examples, storage devices 412 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Network security device 400, in some examples, also includes one or more communication modules 410. Computing device 400 in one example uses communication module 410 to communicate with external devices via one or more networks, such as one or more wireless networks. Communication module 410 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, network security device 400 uses communication module 410 to communicate with an external device such as via public network 102 of FIG. 1.

Network security device 400 also includes in one example one or more input devices 406. Input device 406, in some examples, is configured to receive input from a user through tactile, audio, or video input. Examples of input device 406 include a touchscreen display, a mouse, a keyboard, a voice-responsive system, a video camera, a microphone, or any other type of device for detecting input from a user.

One or more output devices 408 may also be included in computing device 400. Output device 408, in some examples, is configured to provide output to a user using tactile, audio, or video stimuli. Output device 408, in one example, includes a display, a sound card, a video graphics adapter card, or any other type of device for converting a signal into an appropriate form understandable to humans or machines. Additional examples of output device 408 include a speaker, a light-emitting diode (LED) display, a liquid crystal display (LCD), or any other type of device that can generate output to a user.

Network security device 400 may include operating system 416. Operating system 416, in some examples, controls the operation of components of network security device 400, and provides an interface from various applications such as network security module 422 to components of network security device 400. For example, operating system 416, in one example, facilitates the communication of various applications such as network security module 422 with processors 402, communication module 410, storage device 412, input device 406, and output device 408. Applications such as network security module 422 may include program instructions and/or data that are executable by computing device 400. As one example, network security module 422 is able to detect malicious network traffic, infected devices, and other threats using malware protection module 424, and performs ARP spoofing to insert itself between protected client devices and an isolated local network device via ARP spoofing module 426. These and other program instructions or modules may include instructions that cause network security device 400 to perform one or more of the other operations and actions described in the examples presented herein.

Although specific embodiments have been illustrated and described herein, any arrangements that achieve the same purpose, structure, or function may be substituted for the specific embodiments shown. This application is intended to cover any adaptations or variations of the example embodiments of the invention described herein. These and other embodiments are within the scope of the following claims and their equivalents.

The invention claimed is:

1. A method of isolating networked devices on a local network using a networked security device, comprising:

performing Internet Protocol spoofing in the networked security device to intercept network traffic between at least two networked devices on the same local network as the networked security device;

determining, based on behavioral or packet-level analysis of network activity, that one of the at least two networked devices is infected, insecure, or untrusted and identifying the infected, insecure, or untrusted device;

in response to the identification, automatically modifying at least one of an Address Resolution Protocol (ARP) table entry or a firewall routing rule to isolate the identified device from other devices on the local network while maintaining communication between the identified device and an external network;

monitoring the local network for ARP packets to or from the identified device;

detecting that an ARP packet exchange has occurred that would cause the networked security device to become unspoofed and removed from between the identified device and another local network device, such that the networked security device is no longer positioned therebetween;

delaying sending a spoofed ARP packet until completion of the detected ARP packet exchange, including delaying for a period of more than two milliseconds after detecting the ARP packet exchange; and sending multiple spoofed ARP packets at different times over a period of time in response to the detecting and following completion of the detected ARP packet exchange to reinsert the networked security device between the identified device and the other local network devices.

2. The method of isolating networked devices on a local network using a networked security device of claim 1, further comprising selectively blocking intercepted networked traffic between the identified device and other networked devices on the local network.

3. The method of isolating networked devices on a local network using a networked security device of claim 2, wherein selectively blocking intercepted network traffic between the identified device and other networked devices on the local network comprises using iptables or ip6tables rules to selectively block traffic.

4. The method of isolating networked devices on a local network using a networked security device of claim 1, wherein Internet Protocol spoofing comprises at least one of Address Resolution Protocol (ARP) spoofing, Internet Control Message Protocol version 6 (ICMPv6) spoofing, and neighbor table spoofing.

5. The method of isolating networked devices on a local network using a networked security device of claim 4, where performing ARP spoofing comprises sending an ARP packet from the networked security device to a networked device, the ARP packet claiming the networked security device is another device on the local network.

6. The method of isolating networked devices on a local network using a networked security device of claim 4, further comprising monitoring the local network for ARP packets from the at least two local network devices, and reinserting the network security device between the local network devices using ARP spoofing in response to discovering an ARP packet from one of the at least two local network devices.

7. The method of isolating networked devices on a local network using a networked security device of claim 6, wherein reinserting the network security device between the at least two local network devices comprises delaying at least five milliseconds between discovering an ARP packet from the one of the at least two local network devices and sending ARP packets to reinsert the network security device between the at least two local network devices.

8. The method of isolating networked devices on a local network using a networked security device of claim 6, wherein reinserting the network security device between the at least two local network devices comprises sending ARP packets to reinsert the network security device between the at least two local network devices multiple times over the first five seconds after discovering the ARP packet from one of the at least two local network devices.

9. A network security device, comprising:

a processor and a memory;

a malware protection module implemented as software instructions stored in the memory and executed by the processor to analyze network packet content and behavior to determine that a networked device is infected, insecure, or untrusted and identifying the infected, insecure, or untrusted device; and in response to the determination, automatically modifying at least one of an Address Resolution Protocol (ARP) table entry or a firewall routing rule to isolate the identified device from other devices on the local network while maintaining communication between the identified device and an external network;

wherein the instructions, when executed by the processor, further cause the network security device to:

monitor the local network for ARP packets to or from the identified device;

detect that an ARP packet exchange has occurred that would cause the network security device to become unspoofed and removed from between the identified device and another local network device, such that the network security device is no longer positioned therebetween;

delay sending a spoofed ARP packet until completion of the detected ARP packet exchange, including delaying for a period of two or more milliseconds after detecting the ARP packet exchange; and send multiple spoofed ARP packets at different times over a period of time in response to the detecting and following completion of the detected ARP packet exchange to reinsert the network security device between the identified device and the other local network devices.

10. The network security device of claim 9, further comprising selectively blocking intercepted networked traffic between the identified device and other networked devices on the local network.

11. The network security device of claim 10, wherein selectively blocking intercepted network traffic between the identified device and other networked devices on the local network comprises using iptables or ip6tables rules to selectively block traffic.

12. The network security device of claim 9, wherein Internet Protocol spoofing comprises at least one of Address Resolution Protocol (ARP) spoofing, Internet Control Message Protocol version 6 (ICMPv6) spoofing, and neighbor table spoofing.

13. The network security device of claim 12, where performing ARP spoofing comprises sending an ARP packet from the networked security device to a networked device, the ARP packet claiming the networked security device is another device on the local network.

14. The network security device of claim 12, the instructions when executed further operable to monitor the local network for ARP packets from the at least two local network devices, and reinserting the network security device between the local network devices using ARP spoofing in response to discovering an ARP packet from one of the at least two local network devices.

15. A method of isolating networked devices on a local network using a networked security device, comprising:

performing Address Resolution Protocol (ARP) spoofing by the networked security device to intercept network traffic between at least a first networked device and other local network devices on the same local network as the networked security device;

transmitting a spoofed ARP packet from the networked security device to the first networked device to redirect the first networked device's local traffic to the networked security device; and selectively discarding packets addressed to the other local network devices on the same local network while forwarding packets addressed to an external network, thereby isolating the first device from the local network while maintaining its external network connectivity;

monitoring the local network for ARP packets from the first networked device;

detecting that an ARP broadcast from the first networked device would cause the networked security device to become unspoofed and removed from between the first networked device and another local network device;

delaying transmission of a spoofed ARP reply until completion of the detected ARP packet exchange, including delaying for a period of two or more milliseconds; and sending multiple spoofed ARP replies at different times over a period of time in response to the detecting and following completion of the detected ARP packet exchange to maintain isolation of the first device from the local network.

16. The method of isolating networked devices on a local network using a networked security device of claim 15, wherein the networked security device is further operable to make a determination that the first networked device is insecure, infected, or untrusted, and wherein the external network is the Internet.

* * * * *